United States Patent

[11] 3,626,024

[72] Inventors: Klemens Gutweiler;
Edgar Fischer, both of Frankfurt am Main;
Klaus-Dieter Asmus, Hofheim, Taunus, all of Germany
[21] Appl. No. 715,954
[22] Filed Mar. 26, 1968
[45] Patented Dec. 7, 1971
[73] Assignee Farbwerke Hoechst Aktiengesellschaft vormals Meister Lucius & Bruning Frankfurt am Main, Germany

[54] STABILIZED POLYACETALS AND PROCESS FOR THEIR MANUFACTURE
10 Claims, No Drawings

[52] U.S. Cl. .................................................. 260/849, 260/45.9 P, 260/45.95, 260/69 N
[51] Int. Cl. .................................................. C08g 37/32
[50] Field of Search .......................................... 260/849, 45.9 PA

[56] References Cited
UNITED STATES PATENTS

| | | | |
|---|---|---|---|
| 3,063,960 | 11/1962 | Smith ............................. | 260/849 |
| 3,278,470 | 10/1966 | Henshall et al. ............... | 260/849 |

FOREIGN PATENTS

| | | | |
|---|---|---|---|
| 1,029,389 | 5/1966 | Great Britain ................ | 260/849 |

Primary Examiner—John C. Bleutge
Attorney—Curtis, Morris and Safford

ABSTRACT: Stabilization of polyacetals with the use of a homocondensate of hydroxymethyl cyanoguanidine as stabilizer in combination with known oxidation stabilizer.

STABILIZED POLYACETALS AND PROCESS FOR THEIR MANUFACTURE

The present invention relates to a process for stabilizing polyacetals on the basis of formaldehyde by means of a homocondensate of hydroxymethyl cyanoguanidine in combination with known antioxidants.

By "polyacetals" there is generally to be understood polymers whose chain consists preponderantly of $OCH_2$ groups. They may be obtained by homopolymerizing formaldehyde or trioxane, or by copolymerizing trioxane with cyclic ethers, for example oxirane, or cyclic formals, for example 1,3-dioxolane or 1,4-butanediol-formal.

It is known that homo- and copolymers on the basis of formaldehyde have unstable semi-acetal terminal groups from which, with the splitting off of formaldehyde, degradation takes place which degrades the chain of the homopolymers completely and that of the copolymers to the next comonomer unit. In the case of the homopolymers, these unstable semi-acetal terminal groups are industrially stabilized by acetylating or alkylating the terminal groups; in the case of the copolymers they are degraded by an alkaline reaction to the next comonomer unit, by which measure there are likewise obtained polyacetals having alkylated terminal groups.

Even polyacetals having stabilized terminal groups are not yet suited for the manufacture of plastic molding materials because they undergo degradation at the processing temperature. It has already been described that the thermal degradation can be suppressed by stabilizers, above all by the combination of an antioxidant with a nitrogen-containing compound.

A variety of different sulfur-containing compounds have been used as antioxidants. However, these compounds strongly discolor the polyacetals; moreover, there is not attained a maximum of thermal stability with these compounds.

As nitrogen-containing costabilizers there are known: hydantoins, hydrazines, aromatic amines, urea and its derivatives, sulfonamides, polyamides, mixtures of different polyamides, melamine and dicyano diamide. These compounds partly have but a poor stabilizing action, party they provoke a discoloration of the polyacetal although having a relatively good stabilizing action, or they have the disadvantage as, for example, the dicyandiamide that they readily exude from the polyacetals.

British Pat. Specification No. 1,029,389, for example, describes that melamine-formaldehyde resins and dicyandiamide formaldehyde resins, obtained by alkaline condensation from the starting components with an excess amount of formaldehyde, may be used as stabilizers. The behavior of these condensates with respect to discoloration is satisfactory, however, also in this case there is not attained a maximum of stabilization, because exudation of the stabilizer reduces the stabilizing effect.

Now we have found a process for stabilizing polyacetals, characterized in that the stabilization is carried out with a homocondensate of hydroxymethyl cyanoguanidine in a concentration within the range of from 0.01 to 5 percent by weight, preferably 0.1 to 0.5 percent by weight, calculated on the polyacetal, in combination with 0.1 to 5.0 percent by weight of an oxidation stabilizer and, if necessary or required, with the addition of light stabilizers or pigments alone or in combination.

The homocondensate of hydroxymethyl cyanoguanidine ($NC-NHC(=NH)-NH-CH_2OH$) is a stabilizer by means of which, in combination with an antioxidant, excellent stability values are obtained since it does not provoke discoloration of the polyacetals, since it is compatible with polyacetals and far superior as regards exudation from the polymer to melamine and dicyano diamide which in themselves are good stabilizers.

The homocondensate of hydroxymethyl cyanoguanidine used according to the invention is a solid substance which does not melt up to and including 260° C. and is but partially soluble in boiling dimethyl formamide.

The stabilizer to be used according to the invention may be obtained from hydroxymethyl cyanoguanidine in a simple manner by condensation from a solution in the presence of a catalyst having an acid reaction and an entraining agent for the water set free, in which case the condensate separates from the solvent, or it may be obtained direct by a melt condensation with or without the use of a catalyst.

In the melt condensation which is advantageously carried out under reduced pressure and at temperatures above 120° C., the melt which is in the beginning highly fluid passes over into a viscous state with the evolution of water vapor and finally solidifies to yield a hard and brittle mass. This solid mass is finely ground (the particle size should advantageously not exceed 125 microns) and boiled several times with methanol to remove the residual starting compound.

The hydroxymethyl cyanoguanidine homocondensate is preferably obtained by the following methods:

A. 40 grams hydroxymethyl cyanoguanidine were dissolved at 82° C. in 150 ml. diethylene glycol dimethyl ether. To the clear solution there were added 0.2 ml. of ortho-phosphoric acid and, subsequently, continuously benzene as an entraining agent. External temperature and the addition of benzene were regulated so that an internal temperature of 90° to 92° C. prevailed. After approximately 300 ml. of benzene had distilled off, the separated condensate was boiled with methanol, dried, finely ground and again boiled three times with methanol, and dried. Yield: 10 grams.

The condensation was carried out according to method A. Glycol dimethyl ether was used as a solvent and entraining agent. Yield: 13 grams.

40 grams hydroxymethyl cyanoguanidine were maintained in a 2-liter flask at the rotary evaporator, while passing through a weak current of nitrogen, for 1 hour, at 140° C. under a pressure of 30 mm. Hg. The condensate was ground, boiled three times with methanol and dried. Yield: 18 grams.

As oxidation stabilizers there may be used phenols, especially monophenols, bisphenols or polyphenols substituted by alkyl groups containing two to 10 carbon atoms. Suitable representatives of the aforesaid classes of compounds are, for example, 2,6-di-tert,butyl-4-methyl-phenol, isobornyl-o-cresol (partially dehydrated), 2,2'-methylene-bis[4-methyl-6-(α-methyl-cyclohexyl)-phenol],4,4'-butylidene-bis-(6-tert,butyl-3-methyl-phenyl), 4,4'-methylene-bis-(2,6-di-tert,butyl-phenol); preferably there is used 2,2'-methylene-bis-(4-methyl-6-tert.-butyl-phenol). Furthermore, there may be used with advantage the polymeric phenols known under the Trade Mark "Irganox" (manufacturer Geigy AG, Basle), especially "Irganox" 1010 as well as novolaks and mixed novolaks.

To test the stabilizing effect, the condensate used according to the invention was added in the first place together with 0.5 percent by weight of 2,2'-methylene-bis-(4-methyl-6-tert.butyl-phenol) as oxidation stabilizer in the dry way to 5 grams of a hydrolyzed polyacetal made of 98 percent by weight of trioxane and 2 percent by weight of oxirane, and in the second place it was tested together with "Irganox" 1010 as oxidation stabilizer in a pigmented polyacetal. The samples were exposed to air for 45 minutes at 230±1° C. or to oxygen for 30 minutes at 230±1° C., and to air at 120° C. for 12 days. The results of the tests are shown in the tables following hereunder:

TABLE 1

Stabilizing tests carried out with the homocondensate of hydroxymethyl cyanoguanidine (HMCG) in combination with 2,2'-methylene-bis-(4-methyl-6-tert. butyl-phenol) (MBP)

as antioxidant (1 to 5); comparison tests (6 and 7).

| No. | MBP (weight, percent) | HMCG Method of production | HMCG Weight, percent | Loss of weight after 45 minutes at 230° C. while exposed to air (percent) | Color |
|---|---|---|---|---|---|
| 1 | 0.5 | A | 0.1 | 0.54 | White. |
| 2 | 0.5 | A | 0.2 | 0.45 | Do. |
| 3 | 0.5 | B | 0.1 | 0.50 | Do. |
| 4 | 0.5 | B | 0.2 | 0.36 | Do. |
| 5 | 0.5 | C | 0.1 | 0.46 | Do. |
| 6 | 0.5 | | | 12.5 | Brown. |
| 7 | 0.5 | (¹) | 0.1 | 0.65 | Gray-white. |

¹ Dicyanodiamide.

TABLE 2

Stabilization test carried out with the homocondensate of hydroxymethyl cyanoguanidine (HMCG) and "Irganox" 1010 as antioxidant with 0.7 percent by weight of white pigment of the type titanium-dioxide/rutile and 0.007 percent by weight of soot (8); comparison test (9).

| No. | "Irganox" ® 1010 (percent by weight) | HMCG Method of production | HMCG Percent by weight | Loss of weight after — 30 minutes at 230° C. while exposed to oxygen (percent) | Loss of weight after — 12 days at 120° C. while exposed to air (percent) |
|---|---|---|---|---|---|
| 8 | 0.7 | C | 0.1 | 1.00 | 0.20 |
| 9 | 0.7 | (¹) (²) | 0.1 0.03 | 1.37 | 0.37 |

¹ Dicyanodiamide.
² Melamine.

Considering the great number of the commercially available nitrogen-containing stabilizers for polyacetals, it was quite surprising that in the homocondensate of hydroxymethyl cyanoguanidine there was found a stabilizer combining in a high degree the advantageous properties necessary for the quality of a stabilizer. The guanidine derivative used according to the invention, therefore, is especially suitable for stabilizing purposes, particularly for polyacetals.

We claim:

1. A composition comprising a polyacetal and a stabilizing amount of a homocondensate of hydroxymethyl cyanoguanidine having a melting point above 260° C. and a partial solubility in boiling dimethyl formamide, said homocondensate being obtained by (a) condensation of hydroxymethyl cyanoguanidine from a solution thereof in the presence of an acid catalyst and an entraining agent for the water liberated during the condensation or (b) melt condensation of hydroxymethyl cyanoguanidine at a temperature above 120° C.

2. A composition as defined in claim 1, wherein the homocondensate of hydroxymethyl cyanoguanidine is present in a concentration within the range of from 0.01 to 5 percent by weight, calculated on the polyacetal.

3. A composition as defined in claim 1, wherein the homocondensate of hydroxymethyl cyanoguanidine is present in a concentration within the range of from 0.1 to 0.5 percent by weight, calculated on the polyacetal.

4. A composition as defined in claim 1 containing, in addition, 0.1 to 5.0 percent by weight, based on the polyacetal content, of an oxidation stabilizer selected from the group consisting of monophenols, bisphenols and polyphenols substituted by alkyl of two to 10 carbon atoms.

5. A composition as defined in claim 1, wherein the oxidation stabilizer is 2,2'-methylene-bis-(4-methyl-6-tert. butyl phenol).

6. A composition as defined in claim 1, wherein the polyacetal is a copolymer of trioxane.

7. A composition as defined in claim 1, wherein the polyacetal is a copolymer of trioxane with a cyclic ether or a cyclic formal.

8. A composition as defined in claim 1, wherein the polyacetal is a copolymer of trioxane with oxirane.

9. A process for the manufacture of a polyacetal resin stabilized against thermal degradation, as defined in claim 11, which comprises incorporating in the resin a stabilizing amount of a homocondensate of hydroxymethyl cyanoguanidine having a melting point above 260° C. and a partial solubility in boiling dimethyl formamide in combination with 0.1 to 5.0 percent by weight, based on the polyacetal content, of an oxidation stabilizer selected from the group consisting of monophenols, bisphenols and polyphenols substituted by alkyl of two to 10 carbon atoms, said homocondensate being obtained by (a) condensation of hydroxymethyl cyanoguanidine from a solution thereof in the presence of an acid catalyst and an entraining agent for the water liberated during the condensation or (b) melt condensation of hydroxymethyl cyanoguanidine at a temperature above 120°C.

10. The process as defined in claim 9 wherein a known light stabilizer or pigment is likewise incorporated in the resin.

* * * * *

UNITED STATES PATENT OFFICE
CERTIFICATE OF CORRECTION

Patent No. 3,626,024      Dated December 7, 1971

Inventor(s) Gutweiler, Fischer and Asmus

It is certified that error appears in the above-identified patent and that said Letters Patent are hereby corrected as shown below:

In the Heading:

After the identification of the assignee, insert:

--Priority     April 7, 1967

Germany

F 52 062--

Signed and sealed this 13th day of June 1972.

(SEAL)
Attest:

EDWARD M. FLETCHER, JR.
Attesting Officer

ROBERT GOTTSCHALK
Commissioner of Patents